United States Patent [19]

Takeyama et al.

[11] 4,365,979
[45] Dec. 28, 1982

[54] WATER PRODUCING APPARATUS

[75] Inventors: Tetsu Takeyama; Kenkoku Azuma; Akira Ikeda; Toshie Yamamoto; Shigeho Katsurada, all of Amagasaki, Japan

[73] Assignee: Mitsubishi Denki Kabushiki Kaisha, Tokyo, Japan

[21] Appl. No.: 183,458

[22] Filed: Sep. 2, 1980

[30] Foreign Application Priority Data

Sep. 3, 1979 [JP] Japan .................................. 54/113393

[51] Int. Cl.$^3$ .......................................... B01D 53/06
[52] U.S. Cl. ..................................... 55/181; 55/208; 55/387; 55/389; 55/390
[58] Field of Search ................... 55/20, 31, 33, 34, 60, 55/77, 181, 208, 387, 389, 390

[56] References Cited

U.S. PATENT DOCUMENTS

| | | | |
|---|---|---|---|
| 2,138,689 | 11/1938 | Altenkirch | 55/33 X |
| 2,993,563 | 7/1961 | Munters et al. | 55/34 |
| 3,400,515 | 9/1968 | Ackerman | 55/33 X |
| 3,490,201 | 1/1970 | Colvin et al. | 55/34 X |
| 4,012,206 | 3/1977 | Macriss et al. | 55/34 |
| 4,146,372 | 3/1979 | Groth et al. | 55/33 |
| 4,185,969 | 1/1980 | Bulang | 55/31 |
| 4,219,341 | 8/1980 | Hussmann | 55/208 X |
| 4,235,608 | 11/1980 | Watanabe et al. | 55/181 |

FOREIGN PATENT DOCUMENTS

| | | | |
|---|---|---|---|
| 54-18472 | 2/1979 | Japan . | |
| 54-105841 | 8/1979 | Japan | 55/34 |
| 677150 | 8/1952 | United Kingdom | 55/26 |

*Primary Examiner*—Robert H. Spitzer
*Attorney, Agent, or Firm*—Oblon, Fisher, Spivak, McClelland & Maier

[57] ABSTRACT

A water producing apparatus for extracting water from moisture-laden ambient air including a plurality of circumferentially spaced chambers packed with an adsorbent for adsorbing moisture in the air, a driving mechanism for bringing one or more of the chambers into and out of communication with a first and second desorbing section, a mechanism for passing ambient air through the chambers not in communication with the desorbing section, whereby moisture from the ambient air is adsorbed on the adsorbent and subsequently removed from the adsorbent in each chamber as that chamber is brought into communication with the desorbing sections, a recycling duct connecting the post-desorbing section to the predesorbing section to complete a desorption circuit, a mechanism for circulating air through the circuit to remove water from the adsorbent, a mechanism for heating the air in the circuit, and a mechanism for removing water from the circuit. The ratio of the number of chambers in communication with the desorbing sections to the number of chambers receiving moisture-laden air can be varied according to the temperature and moisture content of the ambient air.

8 Claims, 8 Drawing Figures

WATER PRODUCING APPARATUS

BACKGROUND OF THE INVENTION

1. Field of the Invention

The present invention relates to a water producing apparatus for producing liquid water from moisture in air.

2. Description of the Prior Art

A water producing apparatus for producing a desalted water from sea water has been well-known as an apparatus for converting sea water into a desalted water. A water treating apparatus for treating a waste water such as a drainage a high degree to obtain water having high clarity has been proposed. This is one of the water producing apparatus classified in the apparatus for converting sea water into a desalted water. These apparatuses require a solution containing liquid water as a main component for producing water. Thus, these water producing apparatus could not be used to produce water in a place where no liquid water is found such as desert since the liquid water is used as the source.

It has been required to provide a water producing apparatus for producing water even in a place where no liquid water is found. Such novel water producing apparatus has been developed.

The novel water producing apparatus is an apparatus for producing water from moisture in the air and is a novel water producing apparatus which can produce water in any place as far as the air is present. Of course, it is impossible to produce water if no moisture is present in the air. According to the static data for weather and the results of inventor's studies, even in the air in a large desert at the central part of Arabian land, 3 to 4 g. of water is included in 1 m$^3$ of the air, and accordingly, water can be produced. Thus, water can be obtained in a sterile land to live and to work and water can be used for irrigation to culture plants. The water producing apparatus contributes to expand living zones for human-beings and is quite important.

The principle of the water producing apparatus is to produce water by absorbing moisture in the air in an adsorbent as the first step and then, desorbing water adsorbed as steam by heating the water-adsorbed adsorbent and condensing the steam in a condenser as the second step. The adsorbent is dehydrated to recover the adsorbing function whereby the adsorbent can be repeatedly used for adsorbing moisture in air. Thus, liquid water can be repeatedly obtained from air.

FIG. 1 is a front view of the conventional apparatus for producing liquid water in the principle, which has not any opening and closing means such as a valve nor a pipe system.

FIG. 2 is a left side view thereof; FIG. 3 is a right side view thereof and FIG. 4 is a sectional view taken along the line IV—IV of FIG. 1.

In the Figures, the reference numeral (1) designates a column for holding a solid adsorbent for adsorbing moisture which has a cylindrical body having a circular sectional view; (2) designates a rotary shaft for the adsorbent column (1); (3) designates partitions placed around the rotary shaft (2) with equal circumferential spacing of 45 degree for partitioning the column (1) into 8 parts of small chambers (1a); (4) designates a solid adsorbent packed in each of the small chambers (1a) of the adsorbent column (1); (5) and (6) respectively represent first and second cylindrical bodies having the sectional view of the adsorbent column (1) which are placed at both ends of the adsorbent column (1) in coaxial state; (7) designates first partitions for dividing the inner part of the first cylindrical body (5), placed on the inner wall of the first cylindrical body (5) at both the end surfaces; (8) designates a second partition for dividing the inner part of the second cylindrical body (6), placed on the inner wall of the second cylindrical body (6) to be along the plane of the first partition (7); (9) designates a first bearing for rotatably supporting one end of the rotary shaft (2) for the adsorbent column (1) which is placed at the end of the first partition (7) in the adsorbent column (1); (10) designates a second bearing for rotatably supporting the other end of the rotary shaft (2) for the adsorbent column (1) which is placed at the end of the second partition (8) in the adsorbent column (1); (11) designates a belt for rotating the adsorbent column (1); (12) designates a pulley for driving the belt (11); (13) designates a motor for rotating the pulley (12); (14) designates a first closing plate for closing an opening of the lower section partitioned by the first partition (7) at the reverse side to the adsorbent column (1); (15) designates a second closing plate for closing an opening of the lower section partitioned by the second partition (8) of the second cylindrical body (6) at the reverse side to the adsorbent column (1); (16) designates a blower for adsorption which is placed at the opening of the first cylindrical body (5) at the reverse side of the adsorbent column (1) and which feeds the ambient air for adsorbing moisture by sucking it through the upper section partitioned by the first partition (7) into the adsorbent column (1); (17) designates a fitting plate for mounting the blower (16); (18) designates a duct for connecting to the lower section partitioned by the first partition (7) in the first cylindrical body (5) and the lower section partitioned by the second partition (8) in the second cylindrical body (6); (19) designates a blower for recycling the gas for desorption through the recycling passage consisting of the lower section of the first cylindrical body (5), the adsorbent column (1), the lower section of the second cylindrical body (6) and the duct (18) and the blower is placed in the duct (18); (20) designates a heater placed in the duct (18); (21) designates an AC power source for heating the heater (20); (22) designates a condenser equipped to connect a part of the duct (18); (23) designates the pre-adsorbing section (except the lower section) of the first cylindrical body (5) for passing the air for adsorption sucked by the blower (16) into the adsorbent column (1); (24) designates the post-adsorbing section as the upper section adjacent to the lower section in the second cylindrical body, for passing the air behind the adsorbent column (1); (25) designates a pre-desorbing section as the lower section of the first cylindrical body (5) for passing the gas for desorption recycled by the blower (19) to the adsorbent column (1); and (26) designates a post-desorbing section as the lower section of the second cylindrical body (6) for passing the gas for desorption through the adsorbent column (1).

The operation of the conventional water producing apparatus will be illustrated.

The operation will be discussed for the feature that the partition (3) of the adsorbent column (1) is stopped to be in the same plane as those of the first and second partitions (7), (8) and the adsorbent (4) in the column (1) is in dry condition without adsorbing the moisture. (The desorbed condition.)

The blower for adsorption (16) is driven to suck the air for adsorption into the pre-adsorbing section (23) and to feed it into the half of the adsorbent column (1) connected to the pre-adsorbing section so as to contact with the adsorbent (4) packed in this part, and is passed through the post-adsorbing section (24) to be discharged. To begin adsorbing the moisture into the adsorbent (4) packed in the upper half part of the adsorbent column (1), the column (1) is turned a half rotation by driving with the motor (13) and the blower for recycling (19) is driven and the heater (20) is actuated, whereby the dry adsorbent (4) in the column (1) connecting to the pre-desorbing section (25) and the post-desorbing section (26) is changed to connect to the pre-adsorbing section (23) and the post-adsorbing section (24), and to contact with the air for adsorption fed by the blower for adsorption (16) and the adsorbing step is started. On the other hand, the adsorbent (4) adsorbing water in the adsorbent column (1) which is connected to the pre-adsorbing section (23) and the post-adsorbing section (24) is changed to connect to the pre-desorbing section (25) and the post-desorbing section (26). The air remained in the recycling passage consisting of the pre-desorbing section (25), the adsorbent column (1) connected to the pre-desorbing section (25), the post-desorbing section (26) and the duct (18) is recycled by the blower for recycling (19) and is heated to a desired temperature by the heater (20). The desorbing step is started. In the desorbing step, the adsorbent (4) adsorbing water is heated by the air heated to the desired temperature by the heater (20), whereby water is desorbed to form steam. When a water storage tank (not shown) is an open type, a part of the air remained in the recycling passage is fed through the condenser (22) connected to the duct (18) and the water storage tank out of the system because of the volumetric expansion caused by the rising of the temperature of the air in the recycling passage after the initiation of the desorbing step. When the generation of steam is started, the remaining air is gradually substituted with steam whereby partial pressures of steam in the pre-desorbing section (25), the post-desorbing section (26) and the duct (18) are gradually increased to reach to 1 atm. pressure. The steam generated is passed through the same passage to reach the condenser (22). When the condenser (22) is cooled so as to be lower than 100° C., 100% of the steam is condensed into water and water is stored in the water storage tank. After a predetermined time, the adsorbent column (1) is turned a half rotation and the above-mentioned adsorbing step and desorbing step can be continuously performed.

In accordance with the conventional water producing apparatus, any opening and closing means such as a valve and a pipe system need not be used. This is an excellent system in view of the energy saving and operability. There is, however, a certain problem in view of a selection of the optimum condition for the operation to produce water in high efficiency depending upon the weather condition such as the humidity and temperature in the ambient air.

For example, in Arabia, in summer, it is relatively high temperature (35° to 50° C.) and low humidity (3 to 6 g. of a water content per 1 kg. of air) in the inner land such as Riyadh and it is relatively low temperature (25° to 45° C.) and relatively high humidity (11 to 15 g. of a water content per 1 kg. of air) near sea such as Dhahran. Even though they are the lands of water shortage, the weather conditions are remarkably different.

In order to produce water from the ambient air in high efficiency, it is necessary to prolong the adsorbing period over the desorbing period in the land at relatively high temperature and low humidity. It is, however, difficult to vary the ratio of the adsorbing period to the desorbing period depending upon weather conditions in the conventional water producing apparatus.

SUMMARY OF THE INVENTION

It is an object of the present invention to overcome the above difficulty and to provide a water producing apparatus for continuously producing water from air in high efficiency in any weather conditions. The foregoing and other objects of the present invention have been attained by providing the water producing apparatus wherein a ratio of number of the chambers for the adsorbing to the number of chambers for the desorbing in an adsorbent column, can be varied depending upon the weather condition.

DETAILED DESCRIPTION OF THE PREFERRED EMBODIMENTS

Referring to FIGS. 5 to 8, one embodiment of the water producing apparatus of the present invention will be illustrated.

Figure 1:
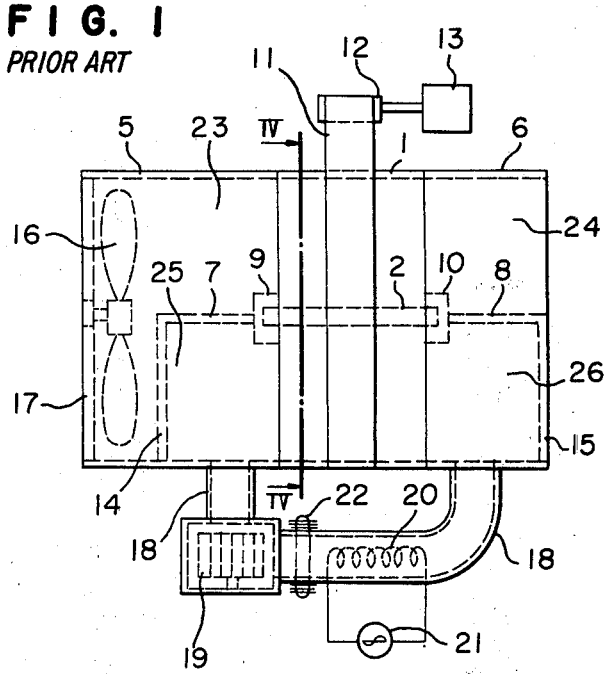
FIG. 1 is a front schematic view of one embodiment of the conventional water producing apparatus.
Figure 2:
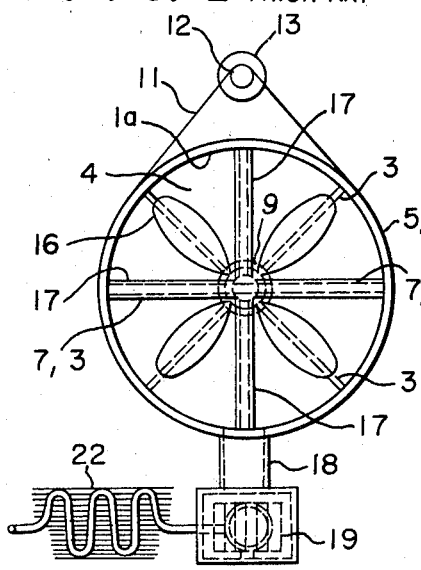
FIG. 2 is a left side view thereof.
Figure 3:
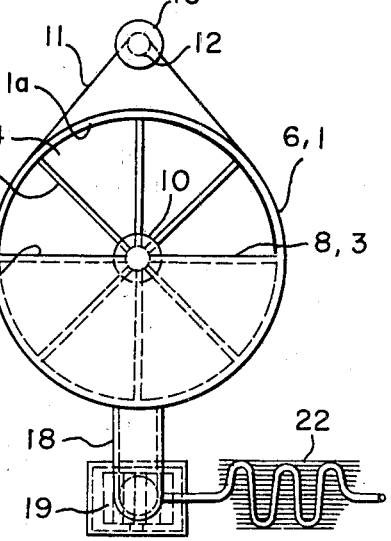
FIG. 3 is a right side view thereof.
Figure 4:
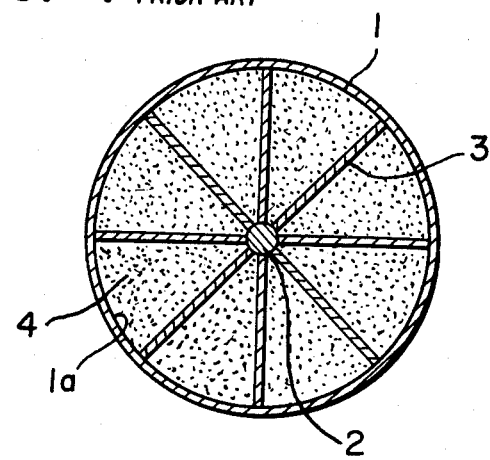
FIG. 4 is a sectional view taken along the line IV—IV of FIG. 1.
Figure 5:
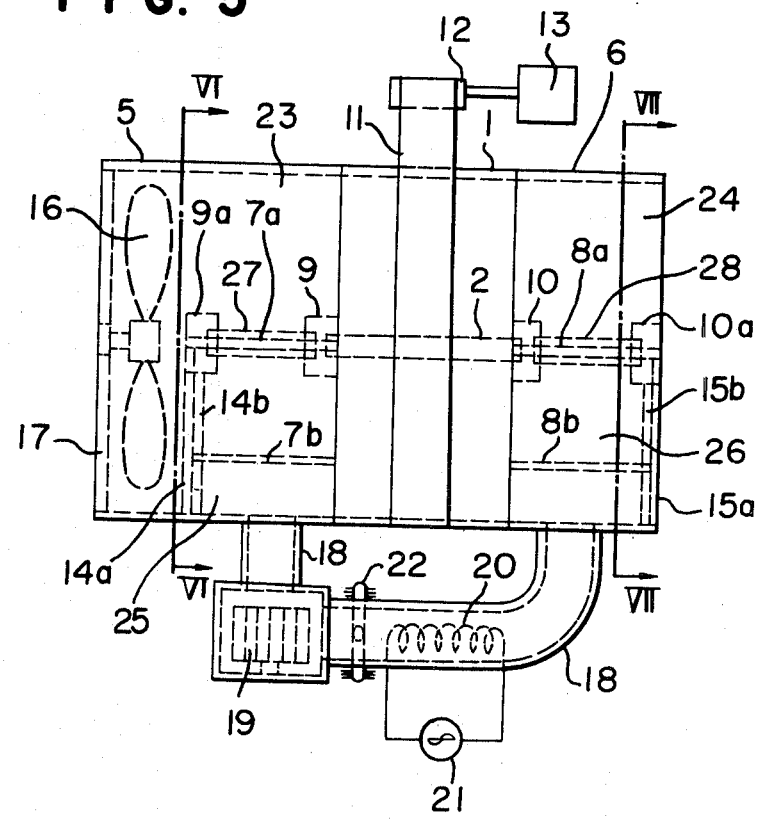
FIG. 5 is a front schematic view of one embodiment of the water producing apparatus of the present invention.
Figure 6:
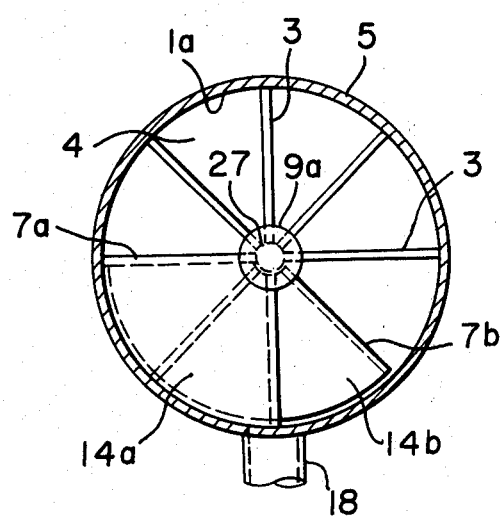
FIG. 6 is a sectional view taken along the line VI—VI of FIG. 5.
Figure 7:
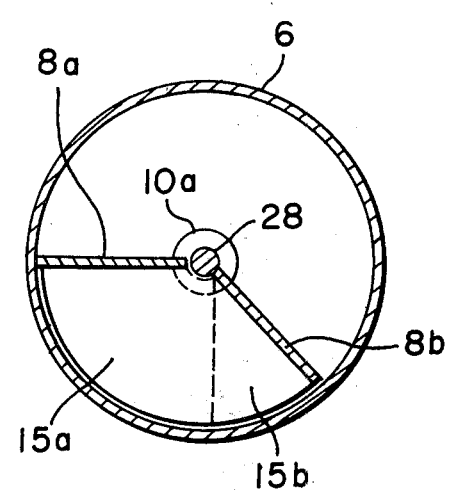
FIG. 7 is a sectional view taken along the line VII—VII of FIG. 5.
Figure 8:
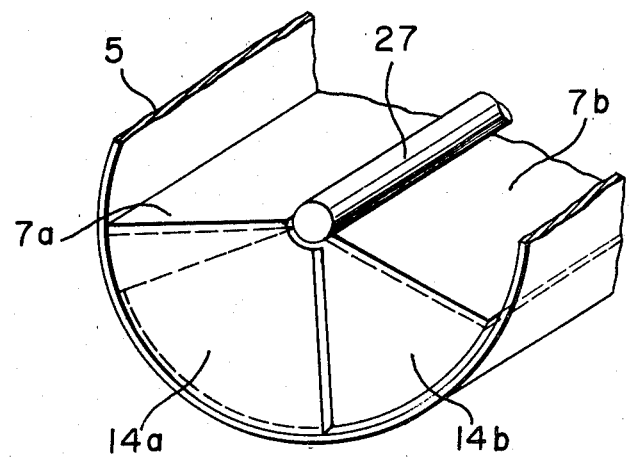
FIG. 8 is a schematic view illustrating partitions of the pre-desorbing section and a closing plate in the embodiment of the present invention.

The structure of the water producing apparatus of the present invention, is the same as that of the conventional water producing apparatus shown in FIG. 1 except that the ratio of the number of small chambers (1a) connecting to the pre-adsorbing section (23) and the post-adsorbing section (24) to the number of small chambers (1a) connecting to the pre-desorbing section (25) and the post-desorbing section (26), in the adsorbent column (1) can be varied.

In the drawings, the reference numeral (27) designates a first rotary rod which is placed along the axis in a part of the first cylindrical body (5) at the side of the adsorbent column (1) and is rotatably held by the first bearing (9) at one end thereof; (28) designates a second rotary rod which is placed along the axis in a part of the second cylindrical body (6) and is rotatably held by the second bearing (10) at one end; (9a) designates a third bearing which rotatably supports the other end of the first rotary rod (27); (10a) designates a fourth bearing which rotatably supports the other end of the second rotary rod (28); (7a) designates a third partition which is mounted on the inner surface of the first cylindrical body (5) at one side surface and slidably contacts with the peripheral surface of the first rotary rod (27) at the other side surface and is placed in the plane including the axis of the first cylindrical body (5). The first bearing (9) and a third bearing (9a) are mounted on the third partition (7a). The reference numeral (8a) designates a fourth partition which is placed in the plane including the axis of the second cylindrical body (6) and in the same plane as that of the third partition (7a) and which is mounted on the inner surface of the second cylindrical body (6) at one side surface and slidably contacts with the peripheral surface of the second rotary rod (28) at the other surface. The second bearing (10) and the fourth bearing (10a) are mounted on the fourth partition (8a). The reference numeral (7b) designates a fifth partition which has one side surface slidably contacting with the first and third bearings (9), (9a) and is mounted on the peripheral surface of the first rotary rod (27) and has the other side surface slidably contacting with the inner wall of the first cylindrical body (5); (8b) designates a sixth partition which has one side surface slidably contacting with the second and fourth bearings (10) (10a) at each end and is mounted on the peripheral surface of the second rotary rod (28) and has the other side surface slidably contacting with the inner surface of the second cylindrical body (6); (14a) designates a third closing plate which is a fan-shaped plate having a central angle of 90 degrees (corresponding to two of the small chambers (1a) of the column (1) ) and has one side surface mounted on the end surface of the third partition (7a) in the reverse side to the column (1) and has a peripheral part mounted on the inner wall of the first cylindrical body (5) and has the central part mounted on the peripheral part of the third bearing (9a); (15a) designates a fourth closing plate which is a fan-shaped plate having a central angle of 90 degrees and has one side surface mounted on the end surface of the fourth partition in the reverse side to the adsorbent column (1) and has a peripheral part mounted on the inner surface of the second cylindrical body (6) and has the central part mounted on the peripheral surface of the fourth bearing (10a); (14b) designates a fifth closing plate which is a fan-shaped plate having a central angle of 135 degrees (corresponding to three of the small chambers (1a) of the adsorbent column (1)) and has one side surface mounted on the end surface of the fifth partition (7b) so as to slidably contact with the surface of the third closing plate (14a) and to slidably contact with the inner wall of the first cylindrical body (5) at the peripheral surface and to slidably contact with the peripheral surface of the third bearing (9a) at the center. In the condition of the fifth closing plate (14b) shown in the drawings, the other side surface of the fifth closing plate (14b) contacts with the surface of the third partition (7a). Each of the above-noted closing plates is oriented substantially transverse to the longitudinal axis of the adsorption column as shown for example in FIG. 8. The reference numeral (15b) designates a sixth closing plate which is a fan-shaped plate having a central angle of 135 degrees and has one side surface mounted on the end surface of the sixth partition (8b) so as to slidably contact with the surface of the fourth closing plate (15a) and to slidably contact with the inner wall of the second cylindrical body (6) at the peripheral surface and to slidably contact with the peripheral surface of the fourth bearing (10a) at the center. In the condition of the sixth closing plate (15b) shown in the drawings, the other side surface of the sixth closing plate (15b) contacts with the surface of the fourth partition (8a). In this embodiment, the pre-desorbing section (25) is surrounded by the third and fifth partitions (7a), (7b) in the first cylindrical body (5), the third and fifth closing plates (14a), (14b) and the adsorbent column (1). The post-desorbing section (26) is surrounded by the fourth and sixth partitions (8a), (8b) in the second cylindrical body (6), the fourth and sixth closing plates (15a), (15b) and the column (1). In this embodiment, the fifth and sixth partitions (7b), (8b) are respectively turned around the rotary shafts of the first and second rotary rods (27), (28) whereby the number of small chambers (1a) in the adsorbent column (1) connecting the pre-desorbing section (25) to the post-desorbing section (26) can be varied from 3 to 5 and the ratio of the number of the small chambers (1a) connecting the preadsorbing section (23) and the post-adsorbing section (24) in the column (1) to the number of the small chambers connecting the predesorbing section (25) and the post-desorbing section (26) can be varied as desired from 5/3, 1 or 3/5.

The operation of the embodiment of the water producing apparatus can be easily understood from the operation of the conventional water producing apparatus. The detailed description is not repeated.

When the water producing apparatus of this embodiment is operated in the weather condition in the place of relatively high temperature and low humidity, it is the optimum condition for producing water from the ambient air at high efficiency to give the adsorbing period of 5 hours and the desorbing period of 3 hours. The ratio of the adsorbing period to the desorbing period is preferably 5/3. The ratio of the number of the small chambers (1a) connecting to the pre-adsorbing section (23) and the post-adsorbing section (24) to the number of the small chambers (1a) connecting the pre-desorbing section (25) and the post-desorbing section (26) is set to be 5/3. The adsorbent column (1) is intermittently turned by 1/8 turn for each one hour. If the operation is started in the dry condition for the adsorbent (4) in the adsorbent column (1), the normal operation for the adsorbing period of 5 hours and the desorbing period of 3 hours is provided after the operation for 8 hours, whereby water can be continuously produced from the ambient air at high efficiency in the optimum condition depending upon the weather condition.

On the contrary, when it is operated in a place of relatively low temperature and high humidity, the ratio of the numbers of the small chambers (1a) is set to be 3/5 and the adsorbent column (1) is intermittently turned each ⅛ turn for each one hour, whereby water can be continuously produced from the ambient air in high efficiency in the optimum condition depending upon the weather condition.

In this embodiment, in order to prevent the mixing of the air in the pre-adsorbing section and post-adsorbing section (23), (24) with the steam in the pre-desorbing section and post-desorbing section (25), (26), the adsorbent column (1) is intermittently turned for each ⅛ turn. It is not necessary to be each ⅛ turn, but it is possible to be each ¼ turn or ⅜ turn in the intermittent turns. The time interval for intermittently turning the adsorbent column (1) can be set as desired depending upon the kind of the solid adsorbent, the temperature and the humidity of the ambient air for adsorption, the required amount of water and the rate of the ambient air fed into the adsorbent column (1) per hour etc. and it is not critical and it is preferably one turn per 30 minutes to 24 hours.

In the embodiment, the column for adsorbent (1) is divided into 8 parts by the partitions (3). This is not critical and the column (1) can be divided into n parts (n is an integer of 2 or more) preferably 3 to 32 parts. When the adsorbent column (1) is divided into 2 parts (n=2), the ratio of the adsorbing period to the desorbing period for the adsorbent is fixed to 1:1. The present invention is not attained. When the adsorbent column (1) is divided into more than 32 parts, the manufacture of the apparatus is not easy and is not suitable for the practical purpose. When the adsorbent column (1) is divided into n small chambers (equal), and the number of the small chambers connecting to the pre-adsorbing section and the post-adsorbing section is m, the number of the small chambers connecting to the pre-desorbing section and the post-desorbing section is n−m. In a place at relatively high temperature and low humidity such as a desert, it is preferably that the adsorbing period is longer than the desorbing period for the adsorbent, in view of the production of water in high efficiency. The movable parts of the pre-desorbing section and the post-desorbing section (the fifth and sixth partitions (7b), (8b) in this embodiment) can be preferably controlled so as to give $m > (n-m)$ that is, $m > n/2$. On the contrary, in a place at relatively low temperature and high humidity, the movable parts of the pre-desorbing section and the post-desorbing section can be preferably controlled so as to give $m > n/2$. In usual, the adsorbent column (1) is intermittently turned each 1/n turn (each one small chamber). Thus, it is possible to intermittently turn each 2/n, 3/n . . . or (n−m)/n turn, if desired.

The structure of the water producing apparatus of the present invention is not limited to the structure of the embodiment and can be modified in the spirit of the present invention. For example, only one of the pre-adsorbing section and the post-adsorbing section can be formed instead of both sections. When only the pre-adsorbing section is formed, a compressing type blower for adsorption is equipped. When only the post-adsorbing section is formed, a suction type blower for adsorption is equipped. It is possible to equip a filter and/or a flow controlling plate in the pre-adsorbing section or the post-adsorbing section. It is also possible to equip a flow control plate in the pre-desorbing section or the post-desorbing section.

In this embodiment, the electric heater is used as the heater. It is not necessary to be the electric heater, but it can be the other heater by using a combustion waste gas, a superheated steam, a Dowtherm gas etc. The condenser can be the other system besides the air cooling system. In this embodiment, the adsorbent column is turned by means of the belt. It is not necessary to use the belt but it is possible to use gears.

The adsorbent used in the column can be solid adsorbents such as zeolite such as molecular sieve 3A, 4A, 5A, 10X and 13X; silica gel, alumina gel, silica-alumina, activated alumina, activated carbon, activated bauxite and activated clay. The absorbent used in a form of an aqueous solution such as lithium bromide and lithium chloride can be used by supporting them on a suitable carrier such as alumina and asbestos to form the adsorbent. The adsorbent can be in a form of grains, beads, pellets, and tablets. It is also possible to form parallel passage type bed using a honeycomb type adsorbent. The adsorbent can be selected depending upon the adsorbing characteristics, the temperature and the humidity.

The condition for the operation of the adsorption and desorption of the adsorbent can be selected as desired depending upon the adsorbent and is not critical.

In this embodiment, the water storage tank is the open type. However, it can be a closed type tank or a tank which is initially opened and closed after purging air from the recycling system with the desorbed steam or modifications thereof, in the present invention.

As described in detail, in the water producing apparatus of the present invention, the ratio of the number of the small chambers for the adsorption to the number of the small chambers for the desorption can be varied, whereby water can be continuously produced in high efficiency in any weather condition.

Obviously, many modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A water producing apparatus for extracting water from moisture-laden ambient air comprising:

a rotatable adsorbent column containing a plurality of circumferentially spaced chambers packed with an adsorbent for adsorbing moisture;

a first member adjacent one end of said adsorbent column, said first member including a first desorbent section of a first predetermined size and a first adsorbent section of a second predetermined size;

a second member adjacent an opposite end of said adsorbent column, said second member including a second desorbent section of a first predetermined size and a second adsorbent section of a second predetermined size;

a driving device for intermittently turning said adsorbent column relative to said first and second members wherein at least one of said circumferentially spaced chamber is in air-tight communication with both said first desorbent section and said second desorbent section and a remainder of said plurality of circumferentially spaced chambers is in flow through communication with said first adsorbent section and said second adsorbent section;

means for passing ambient air through said remainder of said plurality of circumferentially spaced chambers wherein moisture from the ambient air is adsorbed on said adsorbent;

means for removing the moisture from the adsorbent in said at least one circumferentially spaced chamber in communication with said first and second desorbent sections; and means for varying the number of chambers in communication with said first and second desorbent sections which further comprises a first, second, third and fourth closing plate which are positioned substantially transverse to the longitudinal axis of said adsorbent column and are disposed within said first and second member, respectively, and wherein said first and second closing plates are slidable so as to contact one another and said third and fourth closing plates are slidable so as to contact one another.

2. The water producing apparatus according to claim 1 wherein said adsorbent column is separated into 3 to 32 circumferentially spaced chambers.

3. The water producing apparatus according to claim 1 wherein said adsorbent column is separated into n number of circumferentially spaced chambers and m number of said circumferentially spaced chambers are connected to a pre-adsorbing section and post-adsorbing section in a range of m>n/2 an environment at relatively high temperature and low humidity.

4. The water producing apparatus according to claim 1 wherein said adsorbent is a solid adsorbent selected from the group consisting of molecular sieve 3A, 4A, 5A, 10X and 13X, silica gel, alumina gel, silica-alumina, activated alumina, activated carbon, activated bauxite and activated clay.

5. The water producing apparatus of claim 1, wherein said means for varying the number of chambers in communication with said first and second desorbent sections further comprises:
   means for varying said first predetermined size of said first desorbent section; and
   means for varying said first predetermined size of said second desorbent section.

6. The water producing apparatus according to claim 5 wherein said adsorbent column is separated into n number of circumferentially spaced chambers and m number of said circumferentially spaced chambers are connected to a pre-adsorbing section and post-adsorbing section in a range of m>n/2 an environment at relatively low temperature and high humidity.

7. The water producing apparatus for claim 1, wherein said means for varying the number of chambers in communication with said first and second desorbent sections further comprises:
   means for varying the ratio of the number of said circumferentially spaced chambers in communication with said first and second desorbent sections to the number of said circumferentially spaced chambers in communication with said first and second adsorbent sections such that the ratio is optimum for operation depending upon the condition of the ambient air.

8. The water producing apparatus according to claim 1, wherein said first and third closing plates are fan-shaped and have a central angle of approximately 90° and wherein said second and fourth closing plates are fan-shaped and have a central angle of approximately 135°.

* * * * *